United States Patent [19]
Dooley

[11] 3,927,337
[45] Dec. 16, 1975

[54] MAGNETO HYDRODYNAMIC GENERATOR

[75] Inventor: Milton T. Dooley, Florence, Ala.

[73] Assignee: Reynolds Metals Company, Richmond, Va.

[22] Filed: Dec. 12, 1974

[21] Appl. No.: 532,061

Related U.S. Application Data
[63] Continuation-in-part of Ser. No. 458,341, April 5, 1974.

[52] U.S. Cl................... 310/11; 310/4; 219/121 P; 219/123
[51] Int. Cl.² ......................................... H02K 45/00
[58] Field of Search......... 310/11, 10, 4; 219/121 P, 219/123; 315/111.2, 111.4; 313/231.4, 231.5

[56] References Cited
UNITED STATES PATENTS

| | | | |
|---|---|---|---|
| 3,007,072 | 10/1961 | McGinn et al. | 313/231.5 |
| 3,102,946 | 9/1963 | Fonberg | 219/123 |
| 3,480,805 | 11/1969 | Yerrell | 310/11 |
| 3,594,609 | 7/1971 | Vas | 219/121 P X |
| 3,875,633 | 4/1971 | Yoon et al. | 219/123 x |

*Primary Examiner*—Donovan F. Duggan
*Attorney, Agent, or Firm*—Glenn, Palmer, Lyne & Gibbs

[57] ABSTRACT

An MHD generator has a Hall-type duct and uses plasma electrodes located with respect to the duct such that the generator's own magnetic field causes rotation of the arcs that produce the plasma.

17 Claims, 10 Drawing Figures

MAGNETO HYDRODYNAMIC GENERATOR

BACKGROUND OF THE INVENTION

This is a continuation-in-part of commonly assigned U.S. application Ser. No. 458,341 filed on Apr. 5, 1974 for a Plasma Jet Electrode for Magnetohydrodynamic Generators. In accordance with a notice in volume 859 of the Official Gazette dated Feb. 11, 1969, the subject matter of that application is incorporated herein by reference.

The referenced application relates to magneto hydrodynamic generators; and specifically illustrates such a generator of the Faraday type. That is, a "three dimensional MHD generator having plasma flow in a first or "X" dimension; a generated EMF in a "Y" dimension perpendicular to the plasma flow; an a magnetic flux in a "B" dimension perpendicular to both the plasma flow and the EMF. The referenced application also describes a rotating-arc electrode which permits the electrode's nozzle to be enlarged without increasing the mass rate of gas flowing therethrough. That structure, however, includes a supplemental magnetic field winding around the electrode assembly; and it is an object of this invention to provide an MHD generator having rotating arc electrodes which operate without supplemental magnetic field windings.

SUMMARY OF THE INVENTION

In accordance with principles of the invention, a generator's electrodes are located on a Hall-type MHD duct such that the generator's own magnetic field causes rotation of the electrode's arc.

BRIEF DESCRIPTION OF THE DRAWINGS

The foregoing and other objects, features, and advantages of the invention will be apparent from the following more particular description of preferred embodiments thereof as illustrated in the accompanying drawings. The drawings are not intended to be to scale, nor are the various elements intended to be illustrated in proportion. Instead, the drawings are intended to illustrate principles of the invention in clear form.

FIG. 6b is a schematic representation of an alternate embodiment of the structure illustrated in FIG. 6a.

FIG. 6c is a schematic representation of yet another alternate embodiment of the structure illustrated in FIG. 6a.

DETAILED DESCRIPTION

Figure 1:
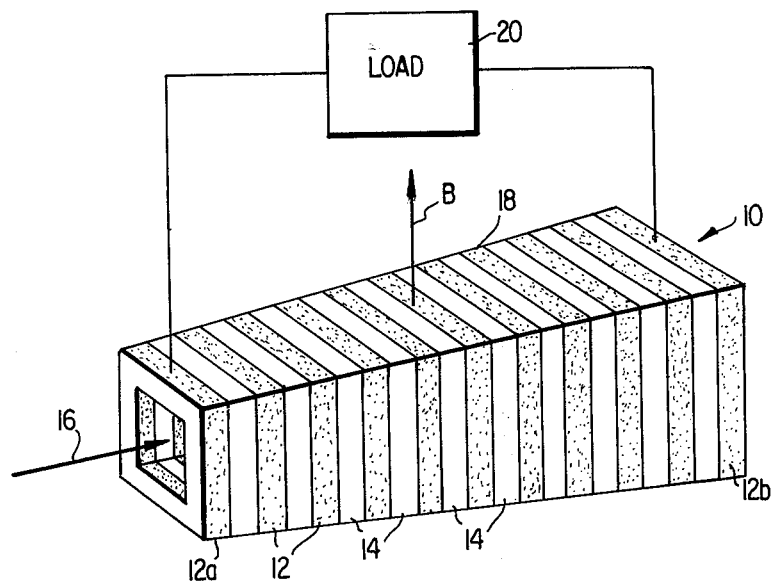
FIG. 1 is a schematic view of a Hall-type MHD generator.

As shown in FIG. 1, a Hall-type MHD generator 10 is comprised of a laminated series of "shorted turns" 12, to be described more fully shortly, and insulated sections 14 arranged so that gas represented by a arrow 16 expands within duct 18 as it passes from left to right in FIG. 1. The generator 10 also includes a coil, not shown, for generating a magnetic field in the direction of arrow B. In this manner, the gas flowing through the duct 18 within the field B causes an EMF to be generated along the length of the duct; and this EMF can be used to drive a load such as 20 connected between shorted turn 12a and shorted turn 12b in FIG. 1.

Figure 2:
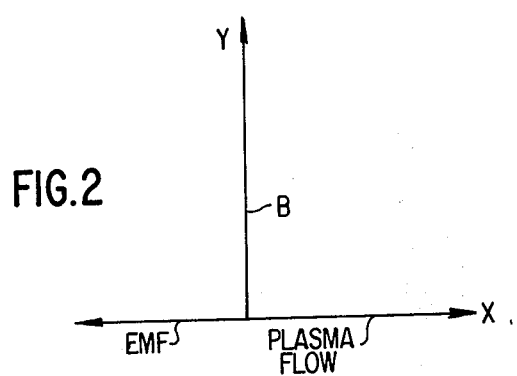
FIG. 2 is a diagram representating the two-dimensional aspects of the illustrated Hall-type MHD generator.
Figure 3:
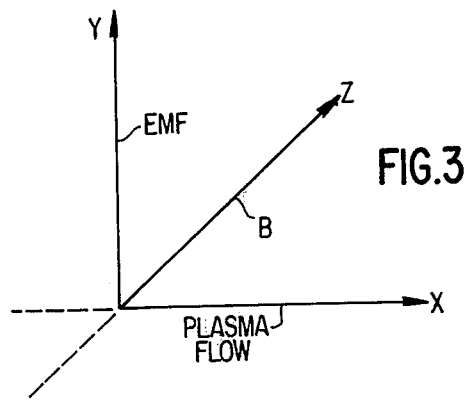
FIG. 3 is a diagrammatic representation of the three-dimensional aspect of a Faraday-type generator.

The above described Hall-type generator can be described as being "two dimensional". That is, as illustrated in FIG. 2, the plasma flow, magnetic flux B and the EMF are all in the same plane, as opposed to the FIG. 3 representation of a Faraday-type generator where the magnetic flux is in a third dimension ($z$ coordinate) rather than in the X–Y coordinates in which the plasma flow and EMF are located. In the above manner, as will be described more fully shortly, the Hall generator's own magnetic field is used to cause an electrode's arc to rotate about its duct orifice.

Figure 4:
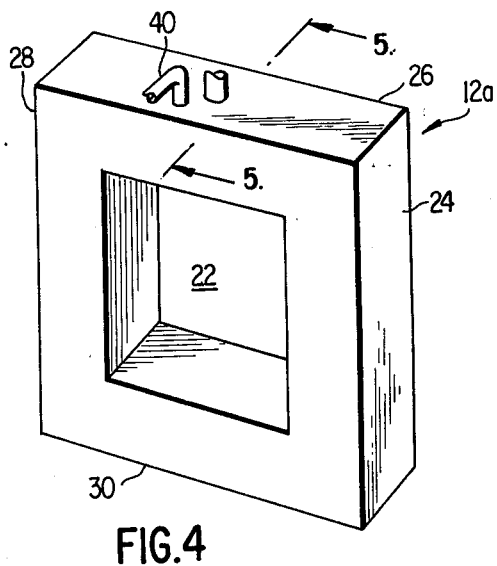
FIG. 4 is a pictorial view of one of a plurality of shorted turns comprising the Hall-type duct of FIG. 1.

FIG. 4 represents one of the shorted turns 12 removed from a Hall generator such as 10. That shorted turn is comprised of copper which, in one embodiment has a duct opening 22 about one foot square and each of its sides 24, 26, 28, and 30 is about one inch square in cross section — the entire duct being comprised of eleven progressively larger copper sections 12 separated by ceramic sections 14 as illustrated in FIG. 1.

Figure 5:
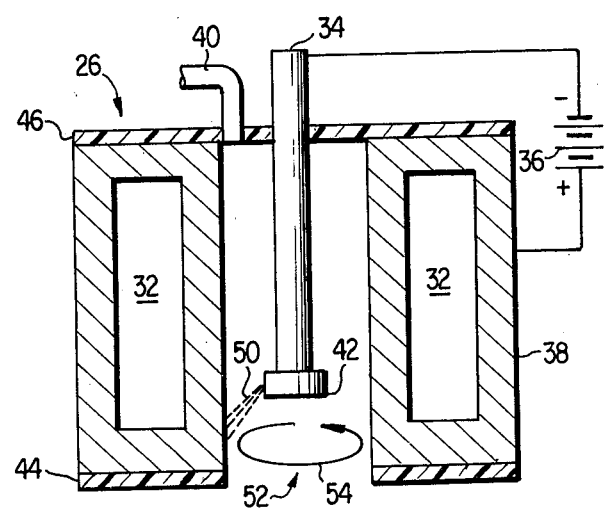
FIG. 5 is a sectional view taken along the lines 5—5 in FIG. 4.

At least one of the legs 26 of the section 12a is hollowed-out as shown in FIG. 5 to provide channels 32 for the flow of coolant to be injected and removed therefrom by a means not shown. The leg 26 also includes an emitter element 34; a voltage source 36 in circuit between the emitter and a channel member 38 which acts as a collector. In this respect, the collector 38 is maintained positive with respect to the emitter 34; and a gas conduit 40 is located adjacent the emitter for blowing argon, nitrogen, helium, or the like, over the emitter tip 42. In this manner, as the gas passes between the collector and emitter, the voltage source 36 ionizes the gas to form a plasma jet.

Figure 7:
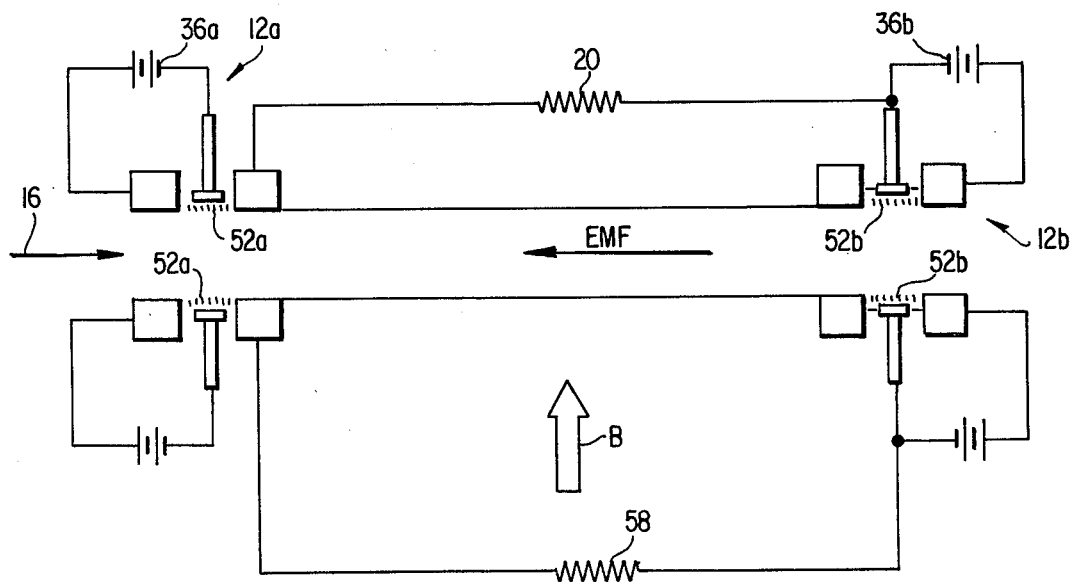
FIG. 7 is a diagrammatic representation of circuit connections for rotating arc electrodes in a Hall-type generator.

The regard, the above described electrode assembly is mounted in a well-insulated duct wall 44; and the outer wall is also insulated by a layer such as 46 extending along the entire duct including shorted turn 12b on the duct's other end which is somewhat larger than turn 12a, but otherwise similarly structured. The load 20, however, is connected between the emitter on one of the electrodes such as in section 12a, for example and the collector on an other electrode such as 12b as illustrated in FIG. 7 to be described more fully later. In this regard, it should be noted that the voltage across the load can be selected by, among other things, connecting it across a selected number of the shorted turns 12.

In operation, as the main plasma stream 16 flows through the duct 18, it interacts with the magnetic flux B so that a potential difference exists between all points located at different distances along the length of the duct; 18, and, as the gas from sources 40 is blown past the emitter tips 42, it is ionized to form plasma jets which function as electrodes and permit a current to be delivered to the load 20.

At the same time, an arc 50 is struck between each emitter tip 42 and collector 38 in FIG. 5. This arc, however, is influenced by the generator's magnetic field so that the arc 50 rotates about the opening 52 formed in the collector 38 as illustrated by the arrow 54. Consequently, as the gas passes through the rotating arc it is heated and considerably expanded to exit from the nozzle opening 52 at a high velocity so that it is better able to penetrate the main stream's boundary layer; or, viewed differently, the rotating arc permits the nozzle opening 52 to be made considerably larger without reducing the plasma jet's velocity or ability to penetrate the boundary layer; and, in this manner increases the electrode's conductive area.

Additionally, it has been found that the rotating arc assists in permitting the hot plasma jet to break down the cold boundary layer that hugs the main duct's inner wall. In this manner the rotating arc improves the structures ability to extract power by reducing voltage drops that would otherwise exist. Still further, the additional energy that is added to the plasma jet serves to increase the energy level of the main duct's combustion gases 16 to further improve the generator's overall efficiency.

Figure 6A:
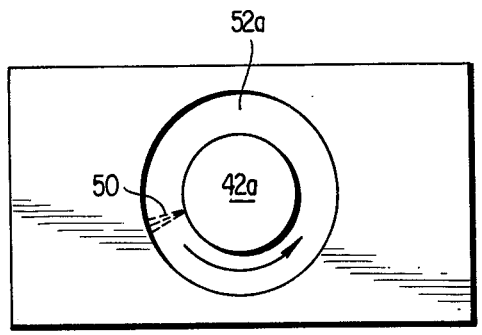
FIG. 6a is a schematic representation of a rotating arc electrode as viewed from the interior of an MHD duct.
Figure 6B:
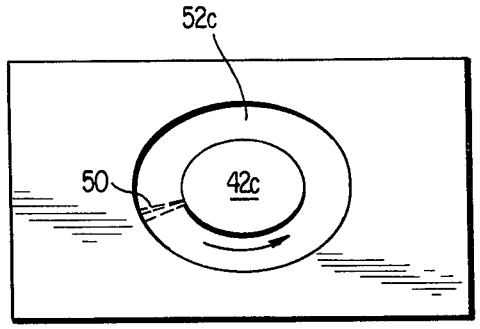
Figure 6C:
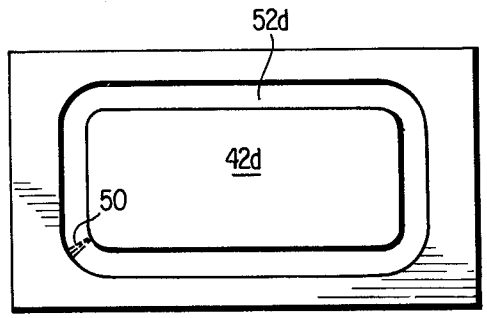

The FIG. 5 embodiment has a circular nozzle area 52 as illustrated in FIG. 6a. The structure's rotating arc abilities, however, permit the nozzle opening 52 to have other configurations such as the eliptical shape shown in FIG. 6b, or, even more preferably, the race-track shape of FIG. 6c which permits almost the entire side of a given section 12 to be used as an electron collection area.

Figure 8:
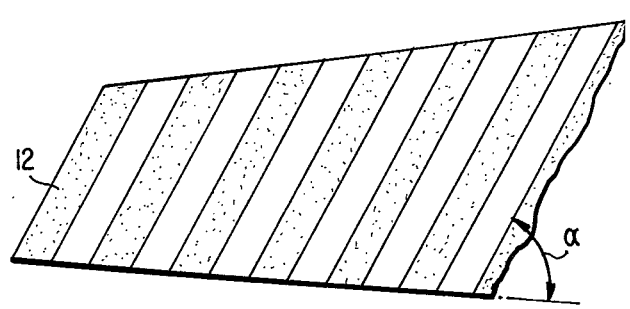
FIG. 8 is a schematic illustration of a slant-wall-type Hall generator.

As noted above FIG. 7 includes a schematic illustration of a manner in which the electrode sections 12a and 12b are suitably connected in circuit with the load. In addition, FIG. 7 includes yet another application of the invention wherein the shorted turn sections 12a and 12b each has two nozzle areas 52 and 56 so that each shorted turn section can accommodate two plasma jet electrodes for feeding two loads 20 and 58 at the same time. Alternatively, as indicated above, one of the loads 20 or 58 (or still another load) can be fed by connecting it between electrodes located in other shorted-turn sections 12; and, as a still further alternative, the above described electrode structures can be located in a slant-wall-type Hall generator duct such as that schematically illustrated in FIG. 8.

It will be appreciated by those skilled in the art that although the invention has been described in specific terms, various other modifications are equally within the scope of the invention. For example, in the preferred embodiments, the plasma jet electrodes are illustrated as being located in the horizontal members of the shorted-turns 12. They can also be located in the vertical legs by merely using a horizontal magnetic field B rather than the vertical field as illustrated in FIG. 1.

The embodiments of the invention in which an exclusive property or privilege is claimed are defined as follows:

1. An MHD system of the type including means for directing a hot fluid through a Hall-type duct comprised of a plurality of electrically conductive sections separated by electrically insulating sections, and means for applying a magnetic field across said duct, said system further including:

a plasma jet electrode located in one of said conductive sections;

said plasma jet electrode having an orifice, an emitter, a collector, and means for passing an ionizable gas between said emitter and collector and out of said orifice; and circuit means for electrically biasing said emitter with respect to said collector and striking an arc between said emitter and collector, said arc being rotatable about said orifice by influence of said magnetic field.

2. The apparatus of claim 1 including a second electrode spaced along said duct from said plasma jet electrode; and a load connected in circuit therebetween.

3. The system of claimm 2 wherein said conductive section includes a cooling means.

4. The system of claim 1 wherein said collector is positively electrically biased with respect to said emitter.

5. The system of claim 1 wherein said orifice is substantially circular.

6. The system of claim 1 wherein said orifice is substantially elliptical.

7. The system of claim 1 wherein said orifice is substantially race-track shaped.

8. The system of claim 1 including a second such plasma jet electrode in a second conductive section of said duct; and a load in circuit therebetween.

9. The system of claim 8 wherein the load circuit includes means for connecting the collector of one of said plasma jet electrodes with the emitter of the other of said plasma jet electrodes.

10. The system of claim 1 including a second electrode spaced along the length of said duct and circuit means connecting said plasma jet electrode to said second electrode;

a third electrode located in said one conductive section; and a fourth electrode in circuit with said third electrode.

11. The system of claim 12 wherein all of said electrodes are of the plasma jet type.

12. The system of claim 10 wherein said second and fourth electrodes are located in a second conductive section spaced along said duct.

13. The system of claim 1 wherein said Hall generator is of the slant-wall-type.

14. The method of operating an MHD generator wherein the arc of a plasma jet electrode is rotated about an orifice thereof, said method including the step of:

using the magnetic field of said MHD generator to rotate said arc.

15. The method of claim 14 wherein said generator is of the Hall-type and includes the step of locating the direction of the plasma jet in the plane of said magnetic field.

16. The method of claim 15 wherein said plasma jet electrode includes an emitter and a collector and wherein said method includes the step of:

positively electrically biasing said collector with respect said emitter.

17. The method of claim 16 wherein said generator includes a second such plasma jet electrode spaced along said duct and wherein said method includes the step of:

connecting a load between the emitter of one of said plasma jet electrodes and the collector of the other of said plasma jet electrodes.

* * * * *